United States Patent
Zilberstein et al.

(10) Patent No.: US 6,606,657 B1
(45) Date of Patent: Aug. 12, 2003

(54) SYSTEM AND METHOD FOR PROCESSING AND PRESENTING INTERNET USAGE INFORMATION

(75) Inventors: Moshe Zilberstein, Haifa (IL); Gaby Matsliach, Givat Ela (IL); Avner Ronen, Modiin (IL); Ronen Ventura, Modiin (IL); Benny Rousso, Bat Yaman (IL); Shai Buber, Tel Aviv (IL)

(73) Assignee: Comverse, Ltd., Tel Aviv (IL)

( * ) Notice: Subject to any disclaimer, the term of this patent is extended or adjusted under 35 U.S.C. 154(b) by 0 days.

(21) Appl. No.: 09/338,482

(22) Filed: Jun. 22, 1999

(51) Int. Cl.[7] ............................................. G06F 17/30
(52) U.S. Cl. ........................ 709/224; 709/227; 710/10
(58) Field of Search .............................. 709/206, 218, 709/224, 226, 227, 229, 228, 232; 705/34; 707/5; 710/10

(56) References Cited

U.S. PATENT DOCUMENTS

| | | | |
|---|---|---|---|
| 5,905,866 A | | 5/1999 | Nakabayashi et al. . 395/200.53 |
| 5,958,016 A | * | 9/1999 | Chang et al. ................ 709/229 |
| 5,960,429 A | * | 9/1999 | Peercy et al. .................... 707/5 |
| 6,023,698 A | | 2/2000 | Lavey, Jr. et al. ............. 707/10 |
| 6,029,145 A | * | 2/2000 | Barritz et al. .................. 705/34 |
| 6,064,981 A | | 5/2000 | Barni et al. .................... 705/26 |
| 6,377,993 B1 | * | 4/2002 | Brandt et al. ................ 709/227 |
| 6,381,644 B2 | * | 4/2002 | Munguia ...................... 709/225 |
| 6,385,644 B1 | * | 5/2002 | Devine et al. ............... 708/206 |

* cited by examiner

Primary Examiner—Ayaz Sheikh
Assistant Examiner—Khanh Quang Dinh
(74) Attorney, Agent, or Firm—Darby & Darby

(57) ABSTRACT

A system and method is disclosed for gathering and disseminating detailed information regarding web site visitation. A server system is connected to the Internet and receives, processes and supplies detailed information from subscribed users. In response to user queries, the server system provides detailed information regarding the sites that have been visited, the duration and times of such visits, the most popular web sites, the most popular jump sites from a particular web page, etc. Such information is gathered and transmitted to subscribers who have downloaded a client-side reporting and communicating software application that is compatible with the server system. In addition, since users submit profile information about themselves, much demographic information is known about the users. Demographic information as to the popularity of visited web sites may then be easily determined, stored and updated by the server system. This demographic information, in turn, may be provided to other users, or web site operators and advertisers. The invention disclosed also allows users to initiate chat sessions with other users visiting a particular web site, or post a virtual note on the site for other subscribers to read.

28 Claims, 13 Drawing Sheets

SYSTEM AND METHOD FOR PROCESSING AND PRESENTING INTERNET USAGE INFORMATION

FIELD OF THE INVENTION

This invention is related to a system and method for providing information about the usage of Internet web sites and pages.

BACKGROUND OF THE INVENTION

The Internet is increasingly becoming a commercially driven environment with web sites of increasing complexity, both in breadth and depth. Information about the number and type of users who are accessing a given web site or page is important both to the individual users themselves, and to third parties for determining the viability of various web page designs and layouts, the computing power and bandwidth required to support the web site, etc. Such information is also useful for applications such as Internet site catalogs.

Various techniques have been employed to determine who is using a particular Internet site or page. Many conventional systems, such as counters that are incremented whenever a particular web site or page is accessed, provide basic frequency of usage information. However, such systems fail to address a number of shortcomings. A first problem with conventional systems is that user information collected in the normal manner does not distinguish between one user accessing a given page many times or many users each accessing the same page once. A second problem is that conventional counting techniques provide no indication of how long users spend looking at a given page before leaving. Thus, techniques of the prior art provide only a limited amount of information with limited accuracy.

Additional information which is valuable, both to the web site operator and to Internet users, is the number and type (i.e. demographics) of users who have viewed or who are currently viewing a web site or page. A third problem with conventional techniques then arises since they do not provide an adequate mechanism for gathering and presenting this data to the users or third parties. In particular, while access counters can determine when a user accesses a given page, they provide no information about how long the user's attention is directed to the page or when the user "leaves" by accessing a different web page or site. Also, access counters do not collect information about the type of user, and therefore cannot report this information. Furthermore, due to proxy servers and other possible caching techniques, user accesses to web pages may be served locally without a user actually accessing the desired web site. Such hits will, thus, not be recorded by the web server.

Because of the limitations in the accuracy and scope of collected information, a fourth problem related to conventional information gathering techniques is that an Internet user cannot easily determine in real time what web sites and pages are popular with other users with similar backgrounds and interests. A fifth problem is that a user can not determine which other users are simultaneously viewing the same web page or site. A sixth problem is that, while a user may be able to view a directory or "map" indicating other web sites and/or pages which are linked or otherwise related to the one they are currently viewing, conventional systems do not permit the user to know how many users are currently at the neighboring pages, to filter the map to show sites with, e.g., a minimum number of active users, with users having particular characteristics, etc., or to determine which links are most popular with users having particular characteristics.

Moreover, while information about frequency of site or page visits is used to compile lists of popular sites, the catalogs are limited to grouping sites by content. A seventh problem, then, is that there is presently no mechanism to permit a user to determine "relevant" sites or pages according to the characteristics of the users of those sites or pages, as opposed to its contents.

An eighth problem with conventional applications is that they also do not permit a user to enter into a real-time chat with other users who are viewing the same page. While some real-time chat capabilities are present, they require the user IDs to be known in advance and are concerned only with whether a user is connected to the Internet, not what page or site they are presently accessing.

For example, the ICQ program, from ICQ, Inc., is an Internet chat program in which subscribing members are assigned a user ID. When a member logs onto the Internet, their ID is transmitted to the ICQ system. Individual users can compile "buddy lists" of other ICQ users and are informed when one of those IDs has logged on or off. However, this feature is limited only to IDs which are known in advance. ICQ users are also able to communicate with each other via, e.g., chat sessions. However, apart from lists of users in various "chat rooms", no information is provided about the activities of the users in general, only whether they are logged in to the Internet.

Another Internet application which purports to provide information about on-line users is the ALEXA application, available from ALEXA INTERNET. The Alexa service works in conjunction with a user's web browser and displays a separate window on the user's computer screen which contains information about the web site currently being viewed and suggests related sites. The Alexa system also tracks a user's usage patterns and uses this information to determine which sites will be of most interest to the individual user, as well as compiling statistical information about the number of Alexa users who have visited a particular web site. However, none of the aforementioned problems are adequately addressed by that system. While Alexa provides some information about web sites, the presented tracking information is merely another variant of the conventional "hit" counter. No information is presented about the numbers or types of other users who may be viewing the same web site or page at the same time, nor are mechanisms provided for one user to communicate with other users who are in the same location.

Thus, there are multiple problems and shortcomings in the prior art as noted above.

SUMMARY OF THE INVENTION

These and other deficiencies in conventional systems are addressed by the system and method of the instant invention in which a user's Internet software is augmented, e.g., by means of a stand alone application, to obtain information about the user and also to obtain information about each web page the user accesses. The user can be asked or required to provide certain biographical information, such as age and gender, during a registration process. The amount of active time a user spends at each page is also determined. When the user jumps to another web page, the new page information and the determined duration of time spent at the previous site are transferred to a central server. Some or all of the additional biographical information can also be provided to the central server. It should be noted that a user may have several open browsers. Any page change in one of them results in a transaction or notification to the server.

The central server compiles the provided information in real time memory structures, such as dynamic memory-based hash stables, and possibly also in disk-based log files. The information is processed to determine the current "hot" Internet sites or pages at or near real-time, the popular sites on a historical basis, i.e., over the past N days or hours, various usage trends, etc. This information can be presented to users in the form of, e.g., a histogram displayed on the user's screen, and integrated with link maps, directory information, and other navigation tools.

An individual user can query the central system to determine whether other users are currently viewing the same page and/or site, and if so, be provided with how many such users exist and their profiles. The query can be general or limited to users meeting certain characteristics according to customized or predefined queries. In this manner, a user can determine the general profile of others accessing the same web site and also identify web pages which.are popular with others having a profile similar to the user's. These queries can also be logged by the central server. In a similar manner, a user can identify related or linked sites according to the number and profile of the present users. Preferably, when a user enters a new web page or site, they are automatically provided information about other users accessing the same web page or site.

According to a further aspect of the invention, a user can communicate with one or more other users accessing the same site at the same time, even if the ID of those users is not known in advance. In one technique, a user can initiate a real-time chat with other site visitors. Prospective chat targets can be identified by querying the central server. Preferably, before a query is processed, the user is required to enter additional information, such as areas of interest, profession, etc. This information can be used to build user profiles, identify compatible or selected chat targets, and, during chat initiation, can be presented to the contacted parties to provide information about the initiating party.

According to the present invention, a user can leave "notes" in a page, as if the page contained a virtual bulletin board. When another user visits the page, they will be notified that a note exists and will be able to communicate with the note owner.

Alternatively, a user can search for other users, regardless of what site they are in, by executing a dynamic search according to specified demographic search parameters. Only users that match the specified search criteria will be identified. The user can then communicate with these users.

The usage information can be further processed on the basis of user biographical information to generate usage profiles for a given site or page. The usage profiles include the number of users who have visited a given site and/or page, when they visited, the active duration of the visit, the profiles of the visiting users, etc. This information is made available to third parties, such as advertisers, users, and site owners and operators directly and via a query system.

According to another aspect of the invention, the system provides for "people based navigation."As an extension of the link map, the system can generate and present to a user a list of pages which are related to the one a user is presently viewing.

The site usage information can also be compiled to determine popular "surf" patterns originating from a particular page. The patterns can be used to identify the most popular next destination(s) for users, further focused according to demographic information.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
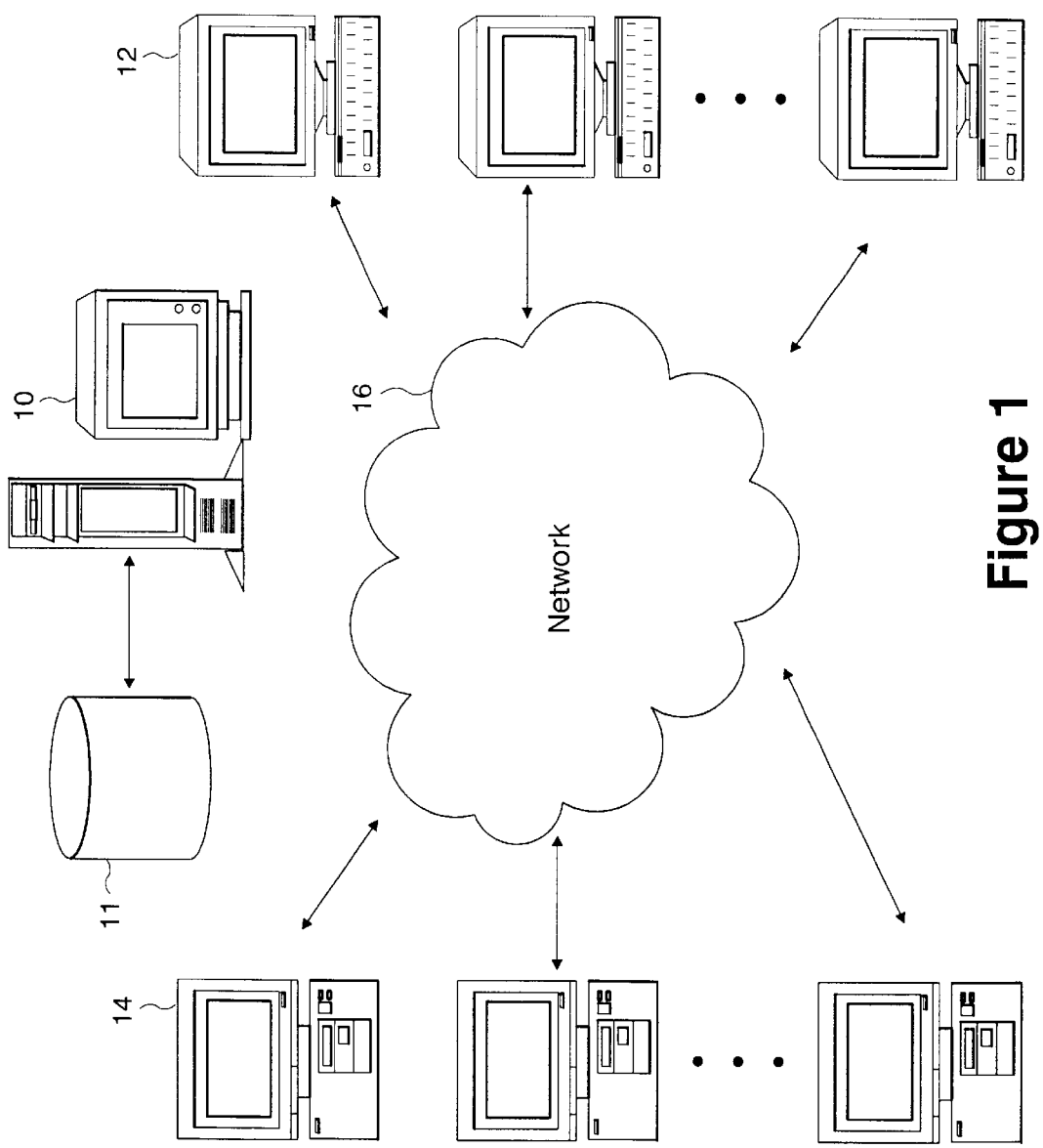
FIG. 1 is a diagram of the network operating environment of the invention.

Turning to FIG. 1, there is shown a diagram of the operating environment of the present invention. A central server or processor 10 having a data store 11 is connected to a network 16, such as the Internet. Although shown as a single unit, the central server may also be a collection of servers linked together. A plurality of data servers 12 are connected to the network 16 and house web sites, each comprising one or more individual pages. Each page within a web site has a unique Universal Resource Locator ("URL"). Also connected to the network 16 are a plurality of user computers 14 operated by users who may exchange data with servers 10, 12. Users of computers 14 access particular web pages by means of appropriate web browsing software, such as NETSCAPE NAVIGATOR or MICROSOFT INTERNET EXPLORER.

In the preferred embodiment, a directory or catalog of selected URLs is prepared by server 10 based on the subject(s) covered, and includes information on the page and associated web site such as title, characteristics, summary, etc. Detailed usage information, such as the types of users who visited the page and how long they remained there, is typically only generated for cataloged pages. For non-cataloged pages, a minimum amount of information, such as the number and duration of visits, is recorded. If sufficiently high usage is detected, an indication can be provided that the un-cataloged page should be added to the catalog. In this manner, system resources are allocated to those pages which are considered to be the most important. Alternatively, all pages may be catalogued, regardless of usage. In addition, users can subscribe to a catalog notification list according to various subjects. When a new site is added to the catalog, users subscribed to that subject are notified.

The usage information is processed to generate certain predefined categories of information. For example, the central server preferably maintains a real-time running total of how many users are presently at each URL. This information is used to provide page and site usage information to a user in response to a notice that they have accessed a given URL. In addition, a list of "hot" sites can be generated based on popularity and indexed according to common demographic parameters, such as a user's age, gender, and occupation. Various hot site lists can be generated according to topical category, such as business, sports, gaming, etc. Real-time hot site information is sent to users in response to queries. The query can be topic specific or global. For a global "all the net" query, all pages that contain registered users, including those not in the catalog, are scanned to determine the "hottest" pages.

In the preferred embodiment, the following user data items are maintained at the central server:

User demographics: age range (and optionally, the exact age of the user), gender, nickname, user location (state), spoken languages, occupation, zodiac sign, family status, and e-mail.

The user interest fields (categories) that he would like to share with others.

The user's favorite query parameters (especially the favorite interest fields). These favorite queries are defined by the user and displayed as special shortcut buttons in the client application.

The web page visits made by the user in a certain time period, e.g., the last predetermined number of days (the URL and the active visit duration).

The list of users defined as the user buddy list.

Real time information regarding the current (real time) position of the user in each of its open browsers.

In addition, the following user data items may be kept on the user's computer:

User demographics: age range (optionally, the exact date of birth), gender, nickname, user location (state), spoken languages, occupation, zodiac sign, family status, and e-mail.

The user's interest fields (categories) that the user would like to share with others.

The user's favorite query parameters (especially the favorite interest fields). These favorite queries are defined by the user and can be displayed as special shortcut buttons in the client application.

The list of users (and their chat information) defined as the user buddy list.

List of e-mails of other users with whom the user wants to communicate via e-mail.

Log of users with whom the user recently communicated (either by sending a message or by direct chat). They can then be added to the user buddy list or the list of friends' e-mails.

According to the invention, the statistical information and usage analysis is made available to owners and operators of web-sites. Queries can also be sent to the central server if the operators wish to extract more specific information from the gathered usage information. For example, a site operator may be interested in determining the number of 20–30 year old female users who visited a particular set of web pages within a web site over the last month during business hours. In addition, the system permits real-time tracking of visitors to web sites and pages, including a notify feature which sends a message to a user, such as a site operator or owner, when other users, perhaps meeting a specified demographic profile, enter the specified page.

Preferably, all of the collected usage information is maintained in full using an appropriate data logging method. This advantageously allows a rich variety of data queries to be processed to provide commercially valuable and reliable site usage information.

According to a further aspect of the invention, users themselves can issue queries about other on-line users to the central server. Certain queries are predefined and are stored either locally on the user's computer or on the central server. The predefined queries can be customized by the users and new queries can also be generated.

In a first type of query, the user enters particular demographic information which is processed to determine which web pages have been (or are currently) popular with users having similar profiles. An example of a graphical input for this type of query and the resulting information is illustrated in FIG. 4.

Figure 4:
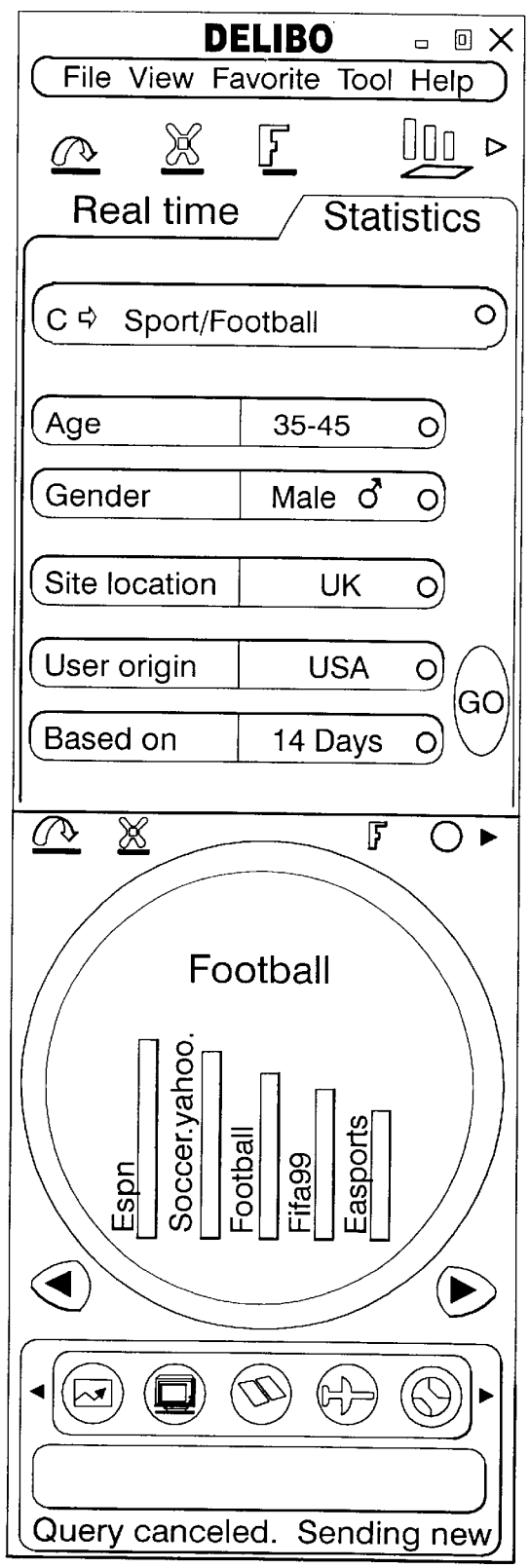
FIG. 4 is a screen display showing a user query input screen and resulting real-time site usage statistics display.

As shown in FIG. 4, a user interface includes one or more demographic filter selectors for attributes such as age and gender, as well as other filters, such as a topical limitation, e.g., sports, news, weather, the geographical location of the web site, the origin of the users considered in the search, and the historic time span within which data should be considered. The top search results are presented in a graphical format, preferably in the form of a vertical histogram having a bar size proportional to the site's popularity (or other indicator) and the site name adjacent the appropriate bars. Optionally, the histogram may be alternated between a vertical and horizontal position by actuating a software button.

In the second type of search, the user can request information about other users who are currently accessing the same page the user is on, or perhaps a related page, and who have profiles which match certain parameters. An example of a graphical input for this second type of query is illustrated in FIG. 5.

Figure 5:
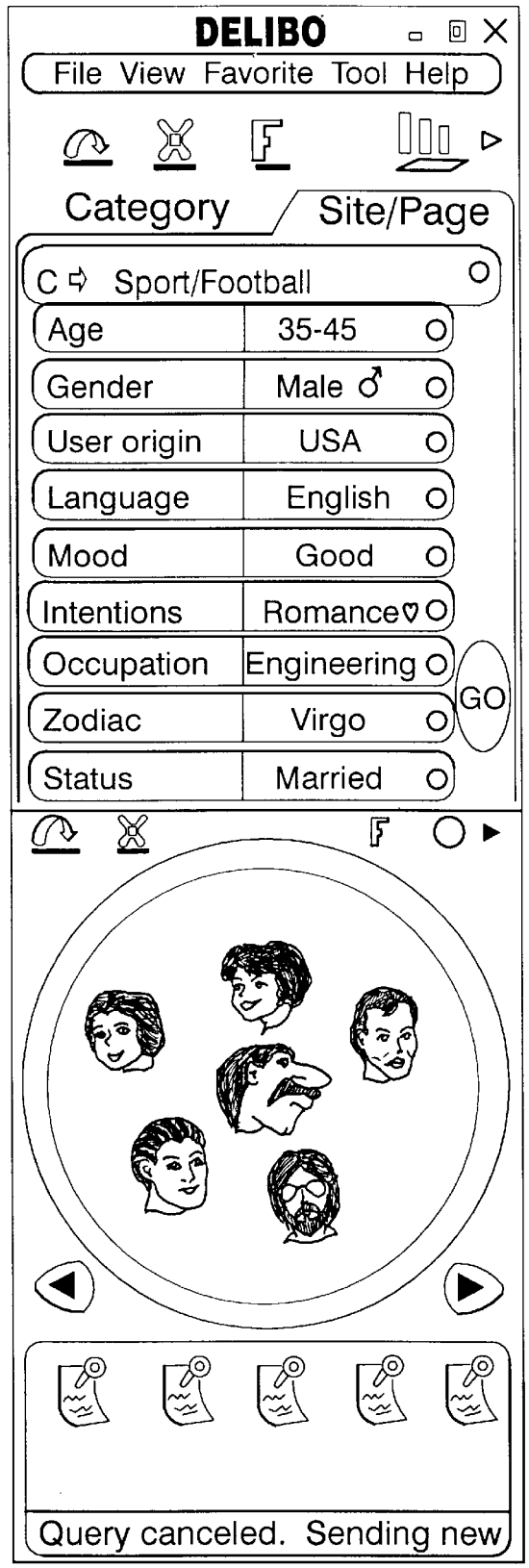
FIG. 5 is a screen display illustrating a graphical input for a site/page usage query.

As shown in FIG. 5, the query input includes fields for entering one or more biographical search criteria and a topic of interest. When the query is submitted, the central server will process it and return information about other users who meet the entered profile. The querying user will then be able to request more information about the located users and perform additional functions, such as initiating a chat session.

In one embodiment, users are allowed to perform unrestricted searches. In the preferred embodiment, however, the user is discouraged from performing a search using parameters which they have not provided for their own user profile. For example, if a user performs a search based on a non-mandatory parameter and the user has not provided such information about him- or herself, a message may be sent to the user indicating that the system suggests that the user not search for other users based on parameters not submitted for the user's own profile. But, as a user provides more information about themselves, they are able to search more precisely without such warning messages and, accordingly, receive information which is more useful. Thus, users are encouraged to provide complete information without mandating that demographic information be entered during the registration process. Preferably, no registration question other than the user's age and gender is mandatory.

The real-time demographic usage information can be compiled and presented to users in a wide variety of different ways. In addition to providing a user with information about other people who are viewing the same web site or page, a user can issue a query to locate other web sites or pages that are popular with users having the same demographic profile. Essentially, a user is able to determine what is popular with other users "like me" in real time.

The collected information can also be integrated with hierarchical navigation "maps". Such maps generally indicate pages which are linked to the one the user is on, pages linked by the linked pages, etc. According to the invention, such a navigation map includes indications about how many users are presently at the neighboring pages. Preferably, the user can customize and/or filter the map so that it shows different levels of depth, e.g., so that it shows only those pages with active users or users having certain characteristics, only particular information about certain pages, etc.

According to another aspect of the invention, the system provides for "people based navigation." As an extension of the link map, the system can generate a list of pages which are related to the one a user is presently viewing. Unlike conventional subject-based sorting, the system according to the present invention considers the demographic profile of various users to determine which sites the present user is most likely to be interested in. For example, in response to such a query, the system can identify other sites which have been or are presently popular with users having similar profiles to the querying user.

The site usage information can also be compiled to determine popular "surf" patterns originating from a particular page. The patterns can be used to identify the most popular next destination(s) for users, further focused according to demographic information. The surf patterns can also be used to generate information about related sites and their relative popularity according to user type.

According to yet a further aspect of the invention, users can initiate chat sessions with other users who are viewing the same page or another page in the same site, even if the ID of the other users is not known in advance. This is possible because the presently disclosed system maintains real-time usage information about the web sites and users.

Once a user has identified one or more target users they wish to chat with, e.g., as a result of executing an appropriate query, a chat session can be initiated. Before requesting a chat session, the user may view the profile of the target users. As with querying, preferably, a user is discouraged from being provided with more information about the target users then they have entered themselves.

In the preferred embodiment, when a user attempts to initiate a chat session with another user, the targeted user is provided with the profile of the initiating user and, based on the provided information, can reject the proffered chat session (explicitly or by simply ignoring the request), accept the chat, or request more information about the initiating user.

A variety of different chat or instant-messaging technologies can be used, as will be apparent to one of skill in the art. In one embodiment, a user provides a local nick-name and/or a graphical image, such as a picture of a face, which will be associated with their profile. Optionally, a default nickname and graphical image will be assigned by the system if the user so chooses. When a chat is initiated, a local nick-name and graphical image may be associated with each user during the dialog.

According to yet a further aspect of the invention, a user can elect to be "invisible" to other users by selecting an appropriate system option. Although data about invisible users will still be gathered and processed by the central server for analysis and review by site owners to gauge popularity of the web site, the information, except for the number of invisible users of a web site, will not be provided to other users. This is to ensure that the page usage information and query results provided to users are not misinterpreted. The number of invisible users who are present at a page is preferably indicated as part of the page usage information.

Figure 2A:
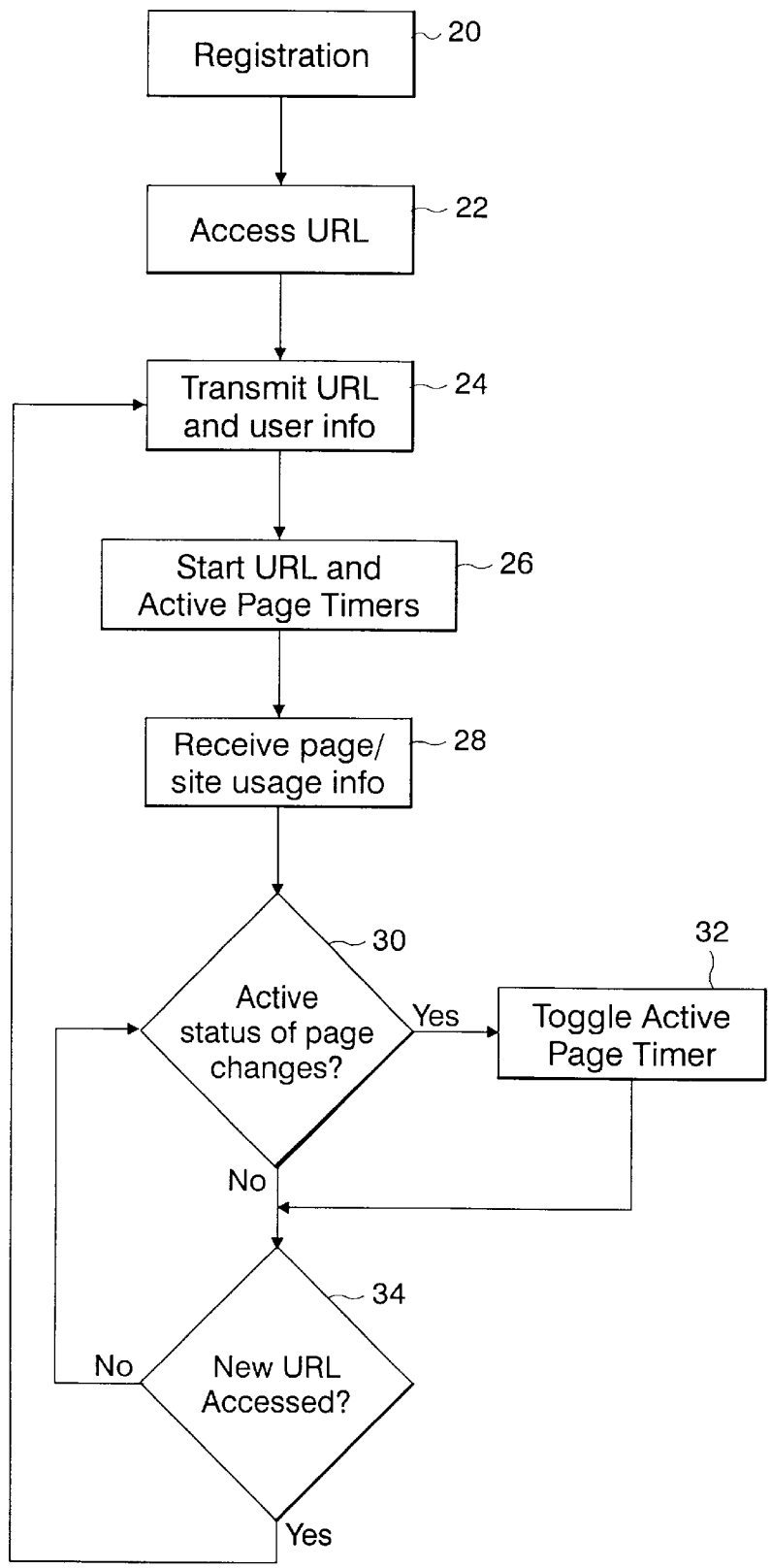
FIG. 2a is a flowchart of the operation of the client-side software of the invention.

According to the invention, usage tracking functionality and various other functions are provided by augmenting the browser system with an additional stand-alone user application. FIG. 2A is flowchart illustrating the basic operation of the client-side user software.

When the software is first installed or operated, the user participates in a registration process. (Step 20). During this process, demographic information is entered. Preferably, the user information entered during registration is sufficient to generate a demographic profile which can be viewed by others while also preserving the user's privacy and anonymity. Such information includes one or more attributes, such as the user's age, gender, geographical origin, fields of interest, occupation, family status, nickname, e-mail address, etc. Preferably, the user is required to provide an age-range, gender, and origin while the other attributes of the profile are optional. A more detailed description of a preferred registration process 20 is discussed further below in conjunction with FIG. 2C.

The profile information entered by the user is both stored locally and on the central system 10. Support for multiple user profiles on a single computer system can also be provided.

The program then interacts with the browser software to determine when the user accesses a new URL. The program also determines when a browser becomes active, such as restoring the browser after it has been minimized or closed. When a new URL is accessed by the user or a browser has been activated or re-activated (step 22), the new URL as well as certain user information is transmitted to the central server. (Step 24). The additional information can include a browser number (or other unique indication of the user's browser that is being tracked), the active time spent on the previous URL, whether this is the first visit of this user in the URL on the calendar day, and whether the access to the page was made by selecting site information provided by the.present application program, or through another means (i.e., a link in the viewed page). As discussed in more detail below, this information is logged by the central server and used to determine how many users are accessing a given web page at a particular time.

Preferably, the URL and user data is transmitted as a message using User Datagram Protocol ("UDP"). UDP does not require a separate Internet socket connection and operates independently of any earlier exchanges between source and destination computers. As a result, the UDP process requires a relatively small software driver, is efficient, and requires very little additional overhead.

In response to receiving the URL and user information, the central server returns a response containing information about the particular URL page the user has accessed, such as the number of other users which are currently viewing the URL, etc., by using a UDP message. Various other types of information can be returned in accordance with bandwidth considerations, user preferences, etc., such as the number of users which are not in an "invisible" status, the number of invisible users in the page, the number of notes left in the page, the number of users in the site which are not invisible, and the number of invisible users of the site. The received information is displayed to the user, preferably in a graphical format (step 28), by the client software, preferably without interaction with the browser.

When a new URL is accessed, one or more timers, such as a URL timer and an Active Page timer, are also started (step 26). The URL timer runs for as long as the user is accessing the particular URL. The Active Page timer is used to determine how much of this access time the page is active, as opposed to being minimized or placed in the background while another page is viewed in a separate browser window or the user switches to another program, and thus runs only when the particular URL page is active.

One method of determining whether a URL is active on the user's computer is to determine whether the user is pointing to the page with an input device, such as a mouse, or by querying the operating system and trapping the "focus gained" and "focus lost" events. Various other techniques can be used, as is known to one of skill in the art. In addition, the timers do not need to be discretely running clocks, but can also be implemented by recording appropriate start and end time-stamps and then calculating the time difference.

At step 30, the system continuously monitors whether an active status of the web page currently being viewed changes (e.g. whether the user switches to a new URL or opens a new browser window and views a different page). When the active status of a current page does not change, but the user opens a new browser window, the process continues directly to step 34, discussed below. However, when the active status of the current web page changes, the process first completes step 32 wherein the system toggles the active page timer by, for example, turning off the timer for the previously viewed page and beginning a timing of the access to the newly accessed web page. In the alternative, at step 32, the active page time may simply be turned off if the user closes all open browsers.

After step 32, the system determines whether a new URL has been accessed (step 34). If so, the process returns to step 24 above, and if not (e.g. when the user simply switches to a new page within the same web site), the process returns to step 30 to continue monitoring changes in the active status of the web page being viewed by the user.

Advantageously, the client side timing eliminates many of the problems associated with monitoring site usage to determine the actual time a user spends at a given web site or page. In particular, because the access time is measured at the user's system, the accuracy of the measurement is unaffected by the use of proxy servers which intercept user queries to popular web sites and redirect them to local copies, thus preventing the queries from reaching the original site and being recorded. In addition, client side monitoring can compensate for time when an Internet browser is opened to a web site but the user is doing something else, such as working in a separate program or using a different browser window.

According to the invention, URL and timing information from a large number of users is constantly being transmitted to the central server. This information is logged and analyzed to generate usage statistics across the universe of system users. Real-time information is maintained in memory, e.g., in hash tables. Statistical analysis of the data is performed off-line. The real-time and statistical usage information can be utilized in a variety of ways.

The statistical information generated can include information about the number and type of users currently accessing a particular page, as well as the number and types of users accessing the page over various time periods. The information is preferably stored in a manner which permits access to usage information in the aggregate and broken down by user profile, as well as over various historical time periods, ranging from near-instantaneous to periods of days, months, and longer. The information may be maintained on either a page basis or site basis. These processes and features are discussed in further detail below.

Figure 2B:
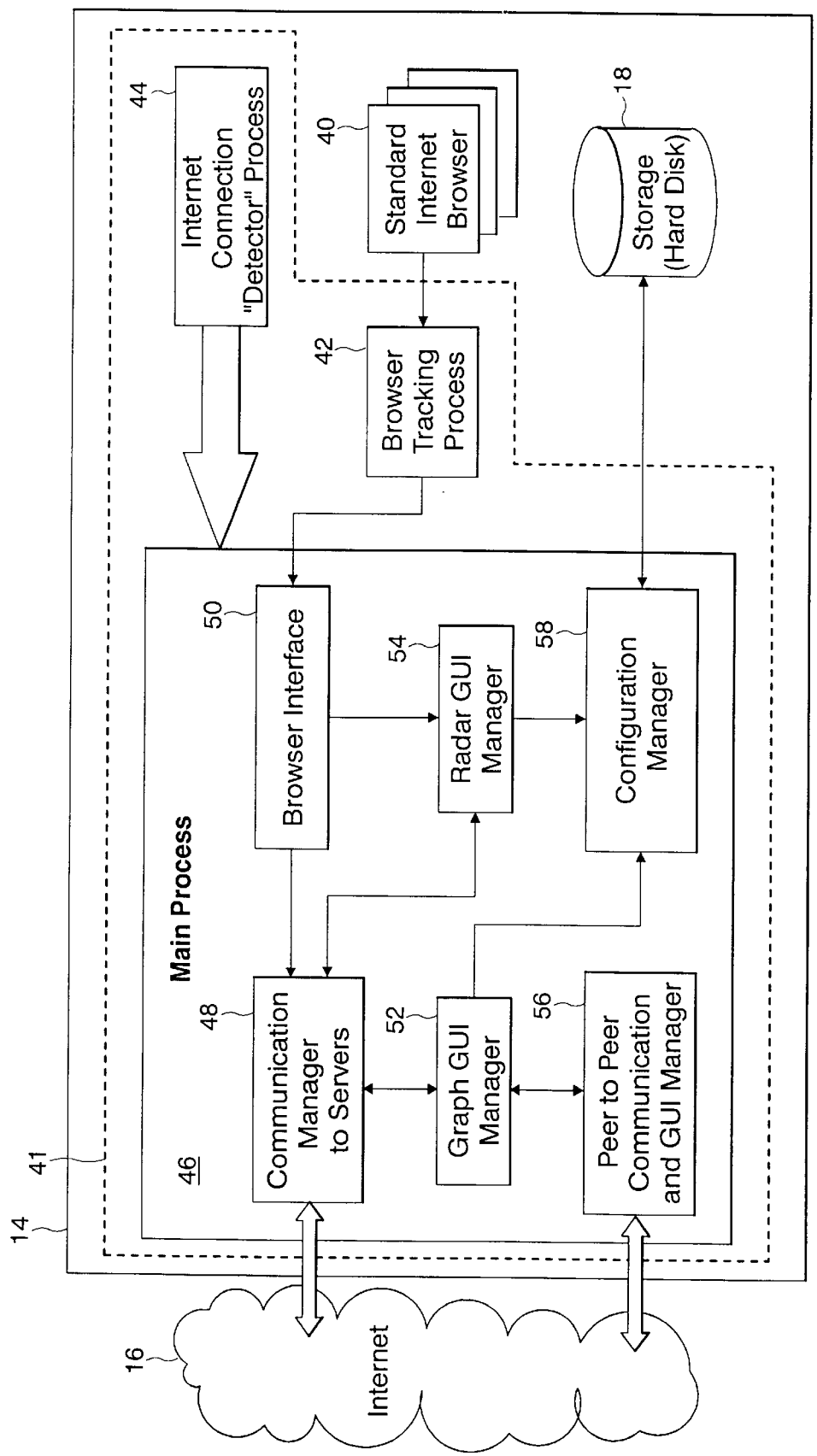
FIG. 2b is a block diagram of the exemplary components of the client-side software of the invention.

Turning now to FIG. 2B, therein is depicted the internal software components preferably stored by a user computer 14 in a data store 18. For purposes of simplicity, the remaining internal hardware components of user computer 14 are not shown. However, components such as a processor, random-access and read-only memory, a display, input ports, output ports and a plurality of known input and output devices will be readily understood to be present by those of ordinary skill in the art.

Internal software components of user computer 14 include a standard Internet browser 40 and client-side software components 41. Internet browser 40 may be any standard Internet browser software package, such as INTERNET EXPLORER, or equivalent browser software used for viewing web sites and web pages on the Internet. Client-side software components 41 include a browser tracking process module 42, an Internet connection detection module 44 and a main process module 46, each operative to enable computer 14 to perform substantially all the client-side functions of the instant invention as described herein.

Browser tracking module 42 operates to store data within data store 18. Module 42 allow computer 14 to track various browsers 40 or multiple windows of the same browser 40 running on computer 14. Browser tracking module 42, in particular, monitors (i) the minimizing and restoring of a browser window, (ii) an opening and closing of a browser application 40, (iii) a user input of a new active URL in the browser 40 and/or (iv) a measure of a total time associated with each of these events. This information is reported to server 10 at predetermined intervals through communication with main process module 46, which in turn, transmits such information over network 16.

Internet connection detection module 44 is operative to detect the launch of either Internet browser 40 or new windows of browser 40. Upon detection of a launch, Internet connection detection module 44 activates main process module 46.

Main process module 46 contains several sub-modules operative to allow computer 14 to perform the functions of the instant invention. Main process module 46 preferably contains central server communication sub-module 48, graphical user interface sub-module 52, peer-to-peer communication sub-module 56, browser interface sub-module 50, "radar" graphical user interface sub-module 54 and communication manager sub-module 58. Server communication sub-module 48 manages data interchanged between sub-modules 50, 52 and 54 of user computer 14 and server 10 which is transmitted over network 16. Browser interface sub-module 50 coordinates data between main process module 46 and browser tracking module 42. Graphical user interface sub-module 52 presents a series of displays and updates for such displays with which a user may interact (commonly referred to as a graphical user interface (GUI)). Sub-module 52 further coordinates the transfer of data received from server 10 to be displayed to a user on computer 14. Sub-module 52 further coordinates the transfer of data received from the user through the GUI to be transmitted to server 10.

Radar graphical user interface module 54 generates a graphical, e.g., circular screen on which, when a user moves from one URL address to another, the new URL name is displayed. In addition, an animation of a turning radar beam is shown within the circular display. Also, one or more dots (preferably in the appearance of stars) are displayed in the circular screen, with each dot representing one or more users who are accessing the particular web site associated with the URL address.

Peer-to-peer communication sub-module 56 controls the transfer of data between main process module 46 and a computer 12, such as a web host, in operative connection with user computer 14. Configuration manager sub-module 58 maintains user configurations such as user profile information and user preferences.

Figure 2C:
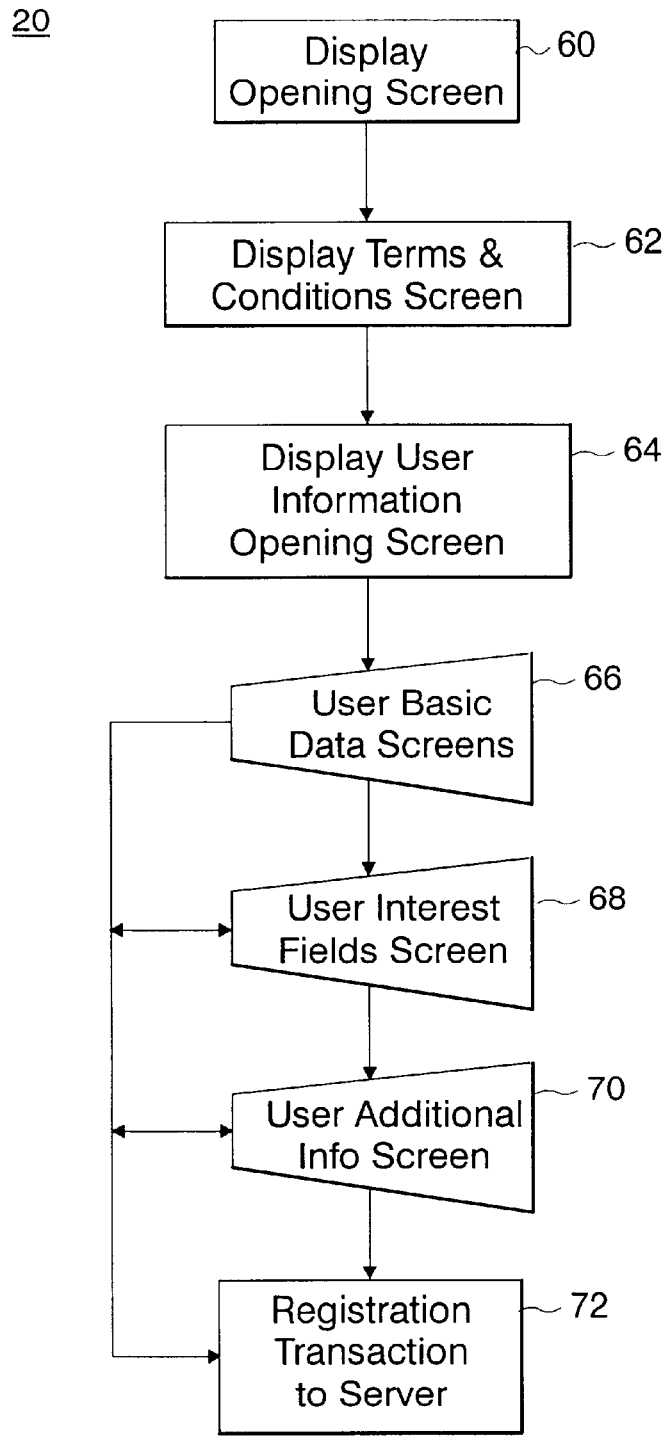
FIG. 2c is a flowchart of an exemplary user registration process of the invention.

Referring now to FIG. 2C, therein is depicted a preferred user registration process 20 by which a user may register him- or herself with an operator of server 10 for purposes of using the instant invention. After installing the software of the instant invention on computer 14, a user is presented with an opening screen containing registration information (step 60). Next, the software displays a standard terms and conditions-of-use screen for acknowledgment by the user (step 62). After the terms and conditions of use have been acknowledged by the user, a user information screen is presented (step 64). On this screen, the user may enter basic information such as their age, gender, geographic location, and optionally, a nickname, a file containing the user's image and the user's e-mail address (step 66). The user is then prompted to input several fields of interest relating to the user's profession, hobbies, social clubs the user belongs to and the like (step 68). Additional personal information may optionally be entered by the user such as languages spoken, zodiac sign, occupation and marital status (step 70). This information is then transmitted from user computer 14 through network 16 to server 10 for storage (step 72). Upon completion of the registration process, the user is allowed to access the functions of the software presented in the instant invention.

Figure 2D:
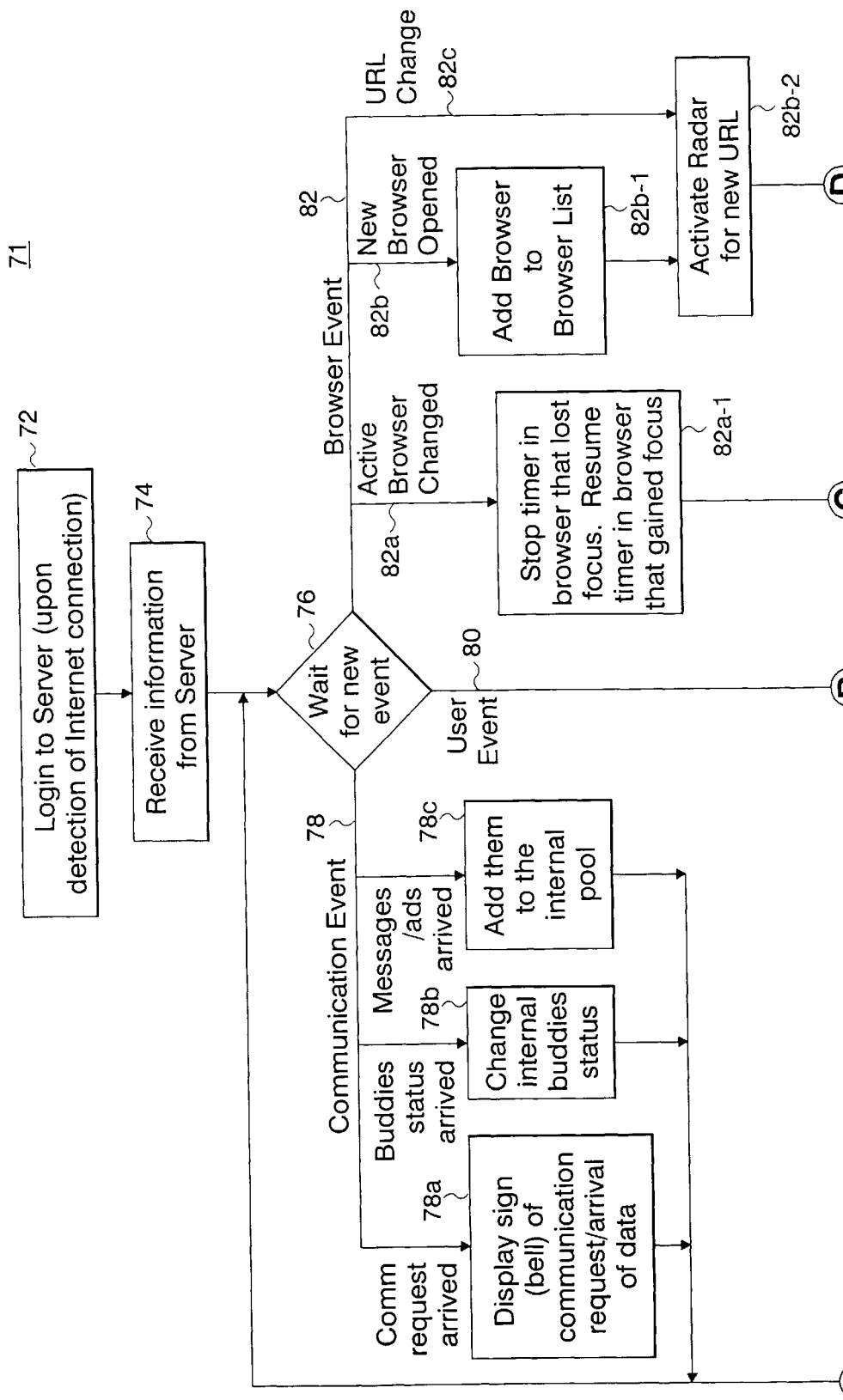
FIGS. 2d and 2e, being joined at points A, B, C, and D, are a flowchart of an exemplary client application process of the invention.
Figure 2E:
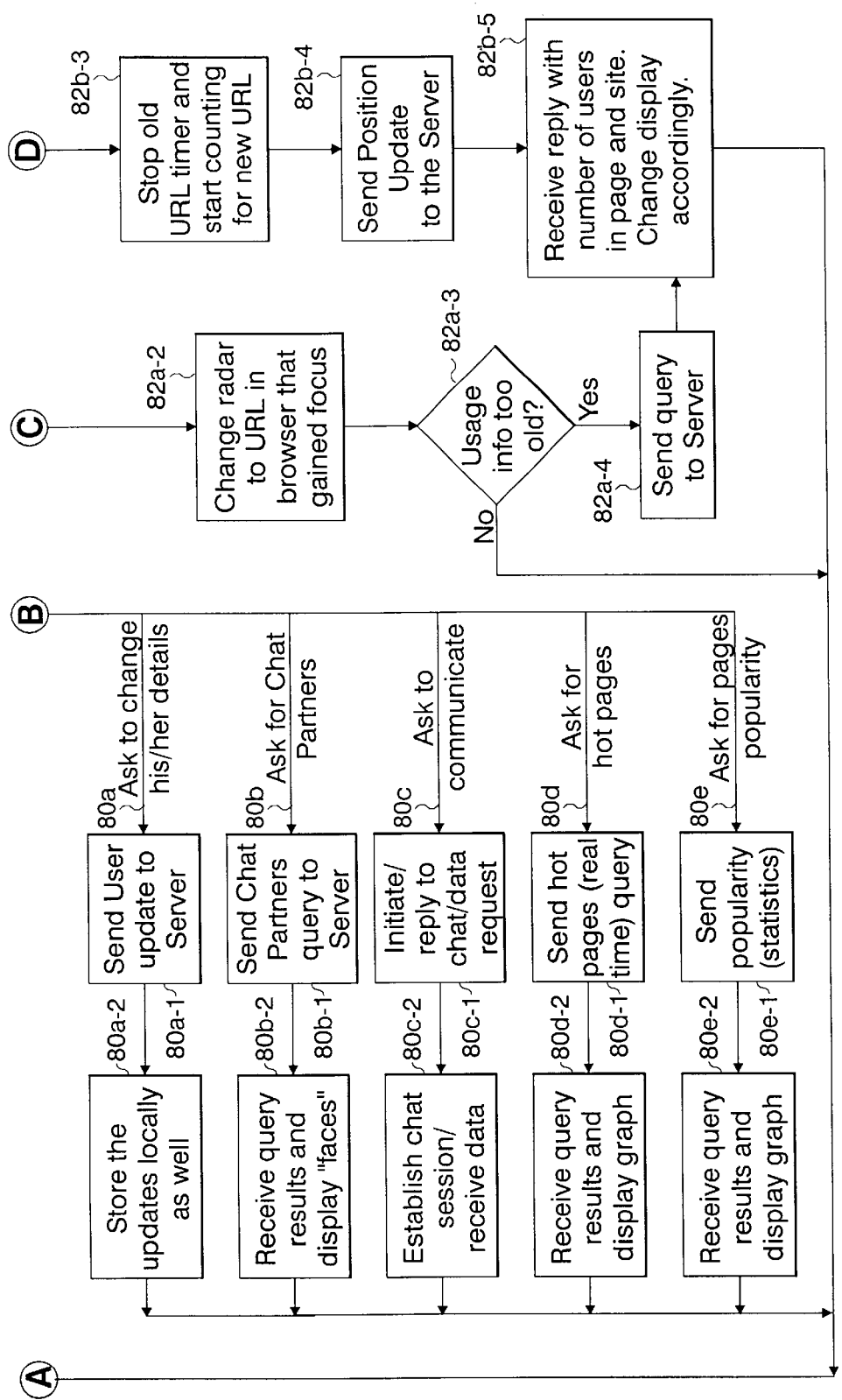

Turning now to FIG. 2D, therein is depicted an exemplary flow chart of the process 71 performed by the client-side software of the instant invention. Process 71 begins when a user computer 14 logs in to server 10 upon detection of the user accessing the Internet (step 72). Next, server 10 transmits information, such as a status of the user's buddy list, messages, advertisements and the like, to user computer 14 for display to the user (step 74). Client-side software then waits for a new event, such as a communication event from the server, a user generated event or a browser event (step 76). Upon detection of a communication event, process 71 proceeds to step 78 wherein the user computer 14 determines the type of communication event.

If the communication event is a request from a second user to chat or communicate with the user, an indication of such is transmitted to user computer 14 and the user is notified by, for example, a display sign or tone (step 78*a*). After such notification, process 71 returns to step 76 and waits for a new event.

If the communication event is a new set of status information for the user's buddy list, such information is updated and displayed on user computer 14 (step 78*b*). After this, process 71 returns to step 76 and waits for a new event.

If the communication event is a new message or advertisement, it is displayed on and stored in user computer 14 (step 78*c*). After this, process 71 returns to step 76 and waits for a new event.

Upon detection of a new user event, process 71 continues from step 76 to step 80 wherein user computer 14 determines what type of user event has occurred. If the user has asked to change his/her user profile, process 71 continues to step 80*a*. The updated information is input and then transmitted to server 10 (step 80*a*-1). Then the information is stored both locally on user computer 14 and in a user database of server 10 (step 80*a*-2), after which process 71 returns to step 76.

If the user has submitted a query to find suitable chat partners, process 71 continues to step 80*b*. The request is transmitted to server 10 (step 80*b*-1). Server 10 then determines results for the query (step 80*b*-2) and the results are displayed to the user (step 80*b*-2), after which process 71 returns to step 76.

If the user has submitted a request to communicate with a second user, process 71 continues to step 80*c*. The request is transmitted to server 10 (step 80*c*-1). Then the chat session is established (step 80*c*-2), after which process 71 returns to step 76. It should be noted that the chat session, as well as other means of communication (e.g. file transfer and URL transfer) is preferably established directly between the two users without involvement of the web server which the two users are visiting.

If the user has submitted a query for a list of hot pages relating to a particular subject, process 71 continues to step 80*d*. The query is transmitted to server 10 (step 80*d*-1). Server 10 then determines the results for this query (discussed further below in conjunction with FIG. 6*b*) and transmits the results to user computer 14 which displays them to the user (step 80*d*-2), after which process 71 returns to step 76.

If the user has submitted a request for popularity statistics, process 71 continues to step 80*e*. The request is transmitted to server 10 (step 80*e*-1). The results are then determined, transmitted to user computer 14 and displayed to the user (step 80*e*-2), after which process 71 returns to step 76.

Upon detection of a browser event, process 71 continues from step 76 to step 82. If the active browser is changed, process 71 proceed to step 82*a*. A timer measuring the amount of time that the old browser was active is stopped and a new timer is initiated for the new browser (step 82*a*-1). A radar of possible jump sites from the page viewed in the new browser is displayed to the user in the new browser window (step 82*a*-2). A determination is then made regarding whether usage information displayed for the URL displayed in the new browser is too old (step 82*a*-3). If not, process 71 returns to step 76. If so, a request for updated page statistics is sent to the server (step 82*a*-4). Process 71 then continues to step 82*b*-5 where updated statistics are received from server 10 and displayed to the user. After this, process 71 returns to step 76.

If the browser event detected is a new browser being opened, process 71 continues to step 82*b*. An identifier of the new browser is transmitted to server 10 to be added to the browser list stored therein (step 82*b*-1). A radar of possible jump sites from the page viewed in the new browser is displayed to the user in the new browser window (step 82*b*-2). A timer measuring the amount of time that the old browser was active is stopped and a new timer is activated for measuring the amount of time for which the new browser is active (step 82*b*-3). The position of the browser (e.g. the URL being displayed) is transmitted to server 10 (step 82*b*-4). Process 71 then continues to step 82*b*-5 where updated statistics are received from server 10 and displayed to the user. After this, process 71 returns to step 76.

If the browser event is a change of URL being displayed in the browser then process 71 continues to step 82*c*. A radar of possible jump sites from the new page being viewed (step 82*b*-2). A timer measuring the amount of time that the old URL was active is stopped and a new timer is activated for measuring the amount of time for which the new page is actively being viewed (step 82*b*-3). The new URL being displayed is transmitted to server 10 (step 82b-4). Process 71 then continues to step 82b-5 where updated page statistics are received from server 10 and displayed to the user. After this, process 71 returns to step 76.

Figure 3A:
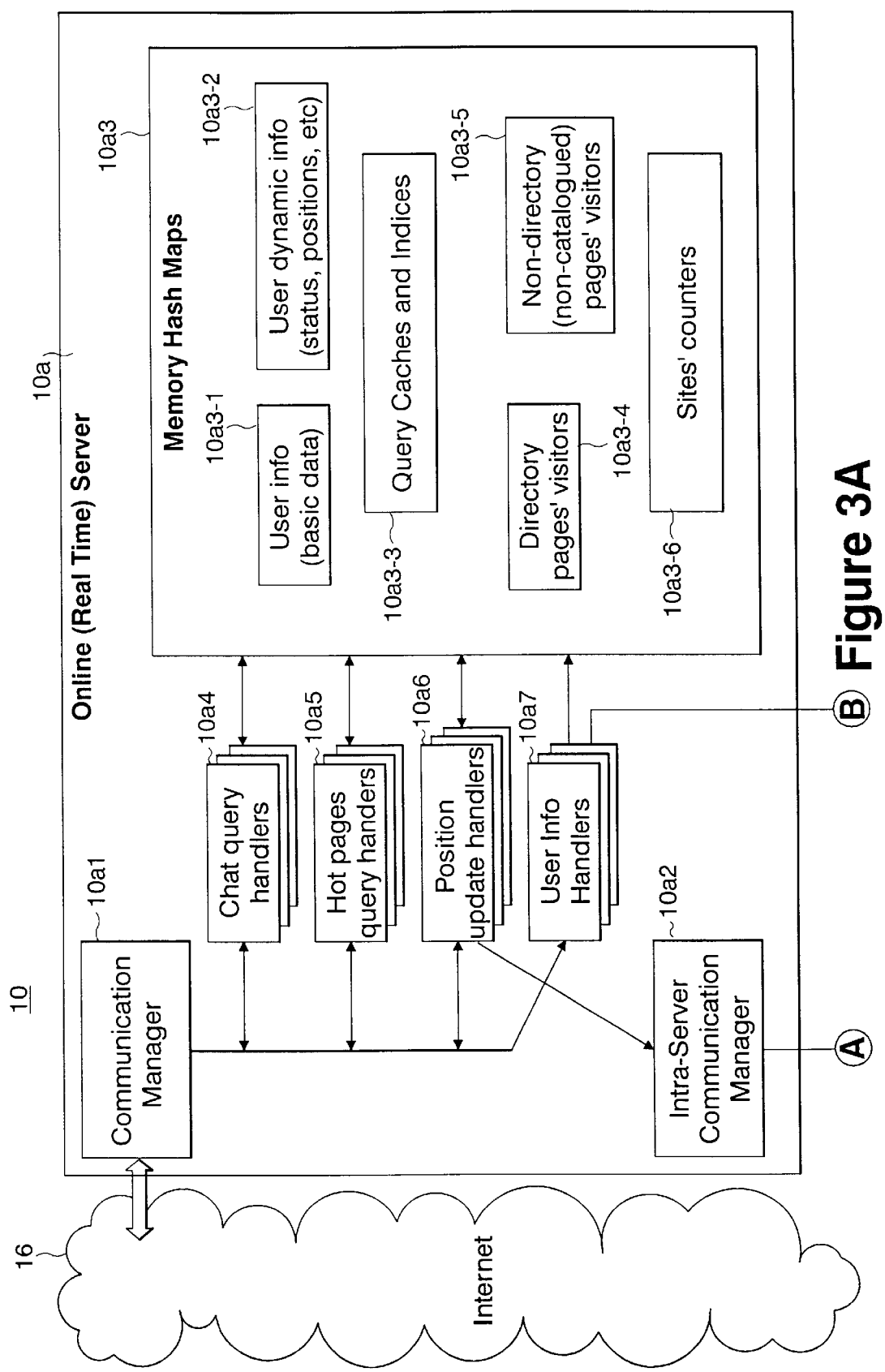
FIGS. 3a and 3b, being joined at points A and B, are a block diagram of exemplary software components of a server used to implement the invention.
Figure 3B:
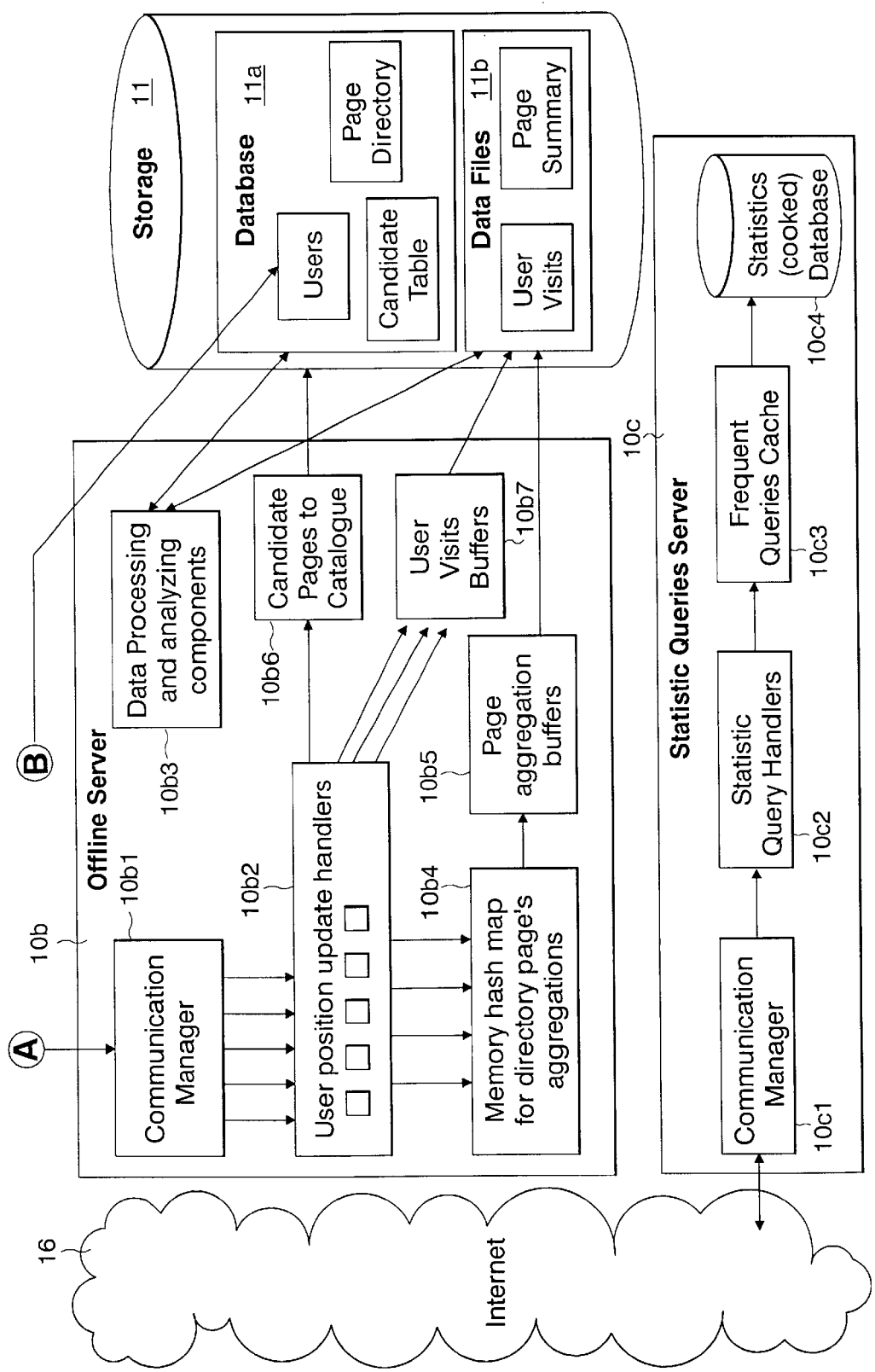

Turning now to FIG. 3, software components of server 10 which carry out the functions of the instant invention are depicted in a block diagram format. Server 10, as described previously may be one or more servers, such as the SUN ENTERPRISE 3500 server, in communication with each other and accessible over a network 16, such as the Internet. Server 10 is further in communication with a data store 11 which may be one or more high capacity data storage devices such as the SUN A-3500. Data store 11 is operative to store database 11a containing user information, page directories, a candidate table for new pages to be added to the directory, and the like. Data store 11 is further operative to store data files 11b containing a summary of user visits, a page summary for pages in the directory, and the like.

Server 10 is preferably an interconnected series of servers for performing specific functions related to the instant invention. For example, server 10 may include an on-line server 10a for handling information to be sent and received over the network 16, an offline server 10b for receiving, processing and storing information handled by on-line server 10a, and a statistics query server 10c for handling queries received from users. Other equivalent configurations of servers may be used.

Online server 10a includes a plurality of software modules 10a1 through 10a7. For example, communication module 10a1 allows server 10a to coordinate information to be transmitted or received over network 16. Intra-server communication module 10a2 allows online server 10a to coordinate data transferred between itself and the remaining servers. Memory hash maps 10a3 store information used in accordance with the present invention such as basic profile information submitted by each user (10a3-1), dynamic user information such as current URL position (10a3-2), query caches and indices (10a3-3), visitors for each page in the directory (10a3-4), visitors of non-catalogued pages (10a3-5) and site counters (10a3-6) for each tracked web site. Server 10a further contains chat query handlers 10a4 for processing user chat queries, hot pages query handlers 10a5 for processing user hot pages queries, position update handlers 10a6 for updating each user's position on the Internet, and user information handlers 10a7 for processing new user information submitted by a user.

Offline server 10b preferably includes a plurality of software modules 10b1 through 10b3 for processing offline functions. Communication module 10b1 allows offline server 10b to coordinate data transferred between itself and the remaining servers. User position update module 10b2 coordinates historical user position data for storage in data store 11. Such data may include aggregate data for pages in the directory 10b3 which may be buffered in page aggregation buffer 10b5 prior to storage in data store 11. The data may further include candidate pages that may be catalogued in the directory 10b6 and user visit information which may be stored in user visit buffer 10b7 prior to storage in data store 11. Data processing module 10b5 retrieves, processes and returns data in data store 11 in accordance with the present invention.

Statistics query server 10c contains a plurality of software modules 10c1–10c4 for processing statistics queries received from users. Communication module loci allows server 10c to coordinate queries and results to be transmitted or received over network 16. Statistics query module 10c2 processes any received statistics queries. Frequent queries cache 10c3 stores popular queries and results which may be transmitted to a user in response to any query which is similar to a stored query and in which the results are not too old. Statistics database 10c4 contains further processed statistics which may be accessed by a user.

Figure 6A:
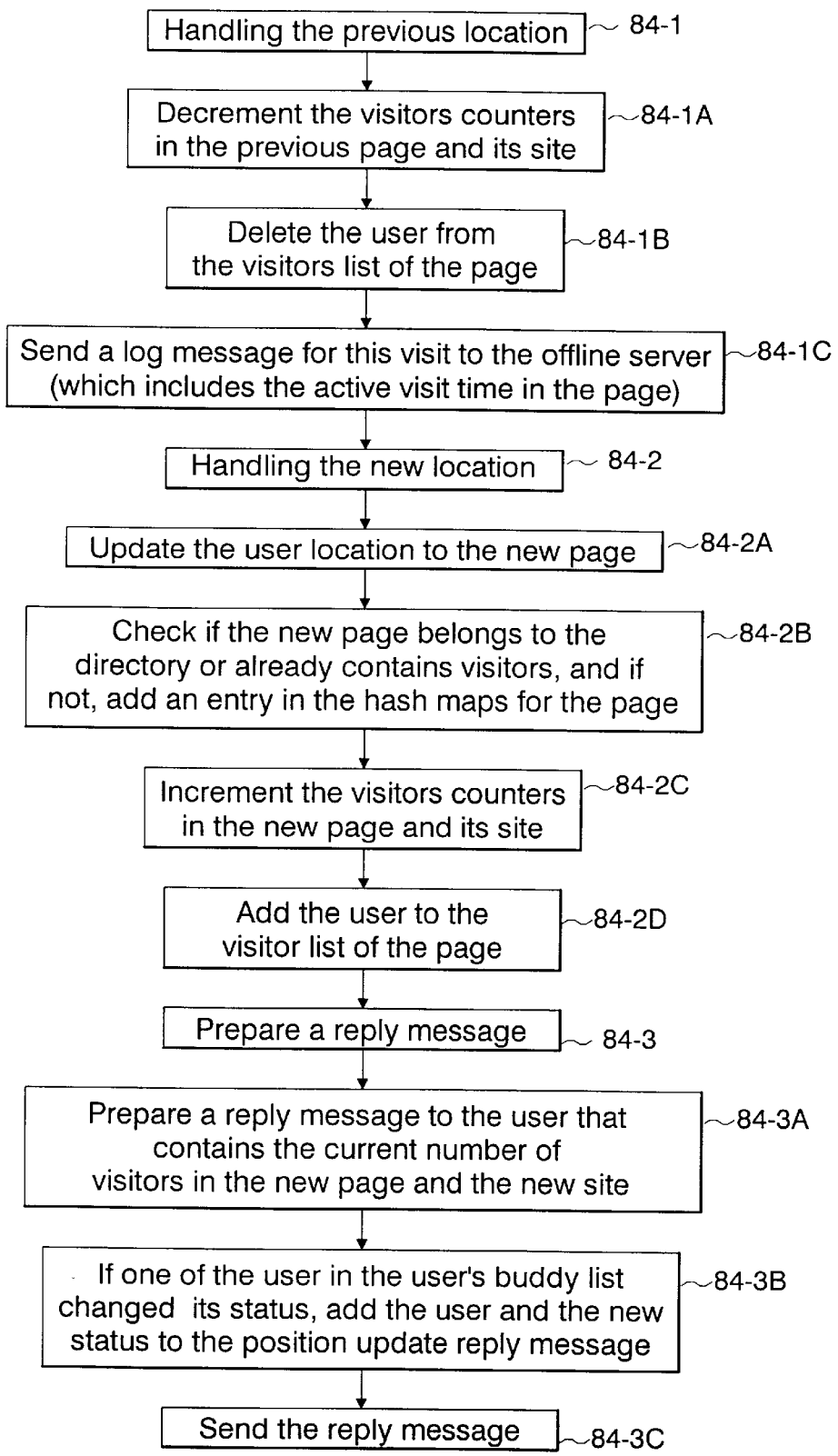
FIG. 6a is a flowchart of an exemplary position update transaction process of the invention.

One feature of the present invention includes the ability to track and maintain real-time statistics regarding visitors to web sites on the Internet. Accordingly, and referring to FIG. 6a, therein is depicted an on-line position update transaction process 84 performed by on-line server 10a. Process 84 tracks a user's current position on the Internet and deletes information relating to the user's previous position. Process 84 begins at step 84-1, where after a change in user position has been detected, server 10a decrements the visitors count of the previous page (step 84-1a), deletes the user from the visitors list for the previous page (step 84-1b) and sends a log message to off-line server 10b including a total time the user was logged on at the previous page (step 84-1c).

Next, at step 84-2, server 10a updates the stored user location to reflect the new page being visited (step 84-2a), determines whether the new page is in the directory (step 84-2b), increments the visitors counter for the new page and/or site (step 84-2c) and adds the user to the visitors list for that page (step 84-2d).

A new message is then prepared and sent to user computer 14 for display via GUI manager 52 (step 84-3). Server 10 will compile information for the message, including an indication of the number of visitors at the new page and the new page's site (step 84-3a). In addition, server 10 will determine whether any of the users assigned to the current user's "buddy list" have changed their status (e.g. become active or inactive) (step 84-3b). The compiled information is then transmitted to user computer 14 (step 84-3c).

Figure 6B:
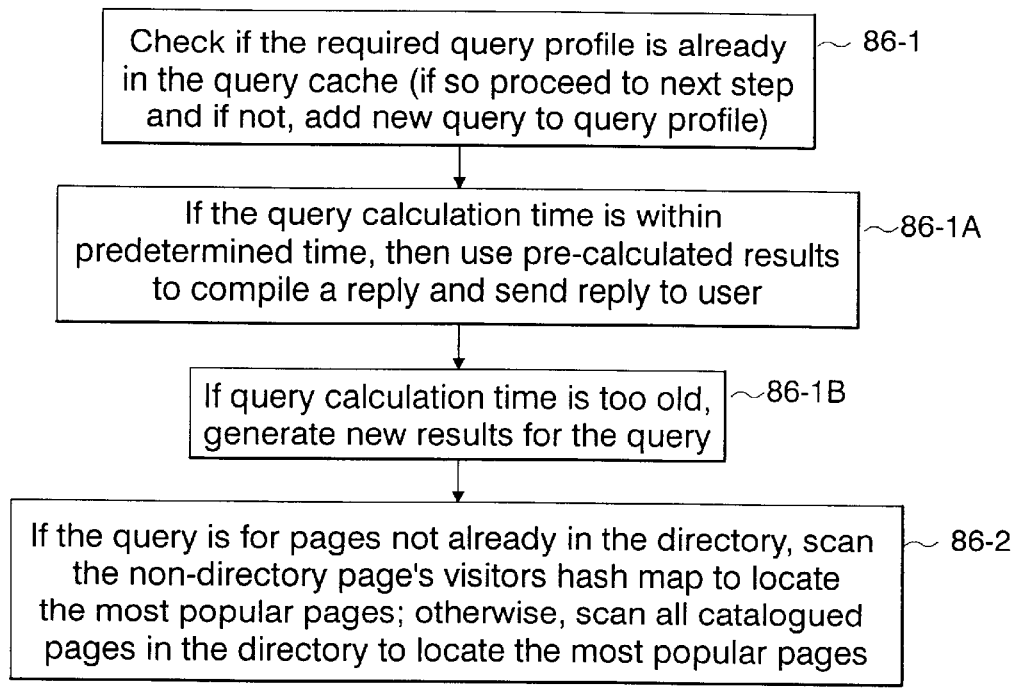
FIG. 6b is a flowchart of an exemplary process for reporting popular pages to a user in accordance with the invention.

A further feature of the present invention allows a user to submit queries for finding sites based on subject matter. The query may include additional requirements such as a popularity level, whether users of the same demographics have visited this site,. etc. Referring now to FIG. 6b, therein is depicted an exemplary process 86 for responding to a user query regarding popular web sites. Process 86 begins when a query is received from user computer 14. Server 10, upon receipt of the query, determines whether the query profile is already located in the query cache 10a3-3 (step 86-1). If a substantially similar query is found, server 10 determines whether the results for the stored query were calculated within a predetermined amount of time (e.g., the results are not too old) and if so, sends the same results to user computer 14 (step 86-1a). If both these conditions are not met, however, server 10 then searches the directory for pages meeting the query profile. When results for the query have been generated, the results and the time of the search are stored in query cache 10a3-3. These results are then transmitted to user computer 14 (step 86-1b).

Should the query include a specific request for only those pages not listed in the directory, process 86 continues to step 86-2 where server 10 will scan non-directory pages visitors' hash map 10a3-5 to locate the most popular non-catalogued pages that correspond to the subject of the query.

Figure 6C:
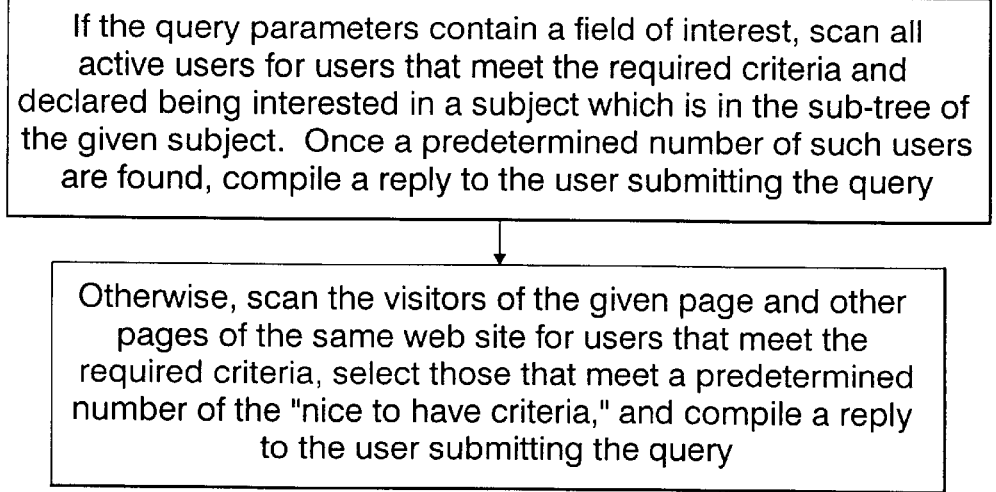
FIG. 6c is a flowchart of an exemplary process for locating chat partners in accordance with the invention.

The software of the present invention is contemplated to include a feature whereby a user may chat with other users meeting a particular set of requirements, or with other users visiting the same web page. Referring now to FIG. 6c, therein is disclosed an exemplary process 88 for responding to a request from user computer 14 to locate suitable "chat partners." At step 88a, server 10 receives from user computer 14 a set of preferred parameters for other users to chat with, including fields of interest, age, gender, profession, and the like. Then, at step 88b, server 10 selects a predetermined number of other users, in order of the number of criteria matching the criteria sent by user computer 14, and transmits the results to user computer 14.

Figure 6D:
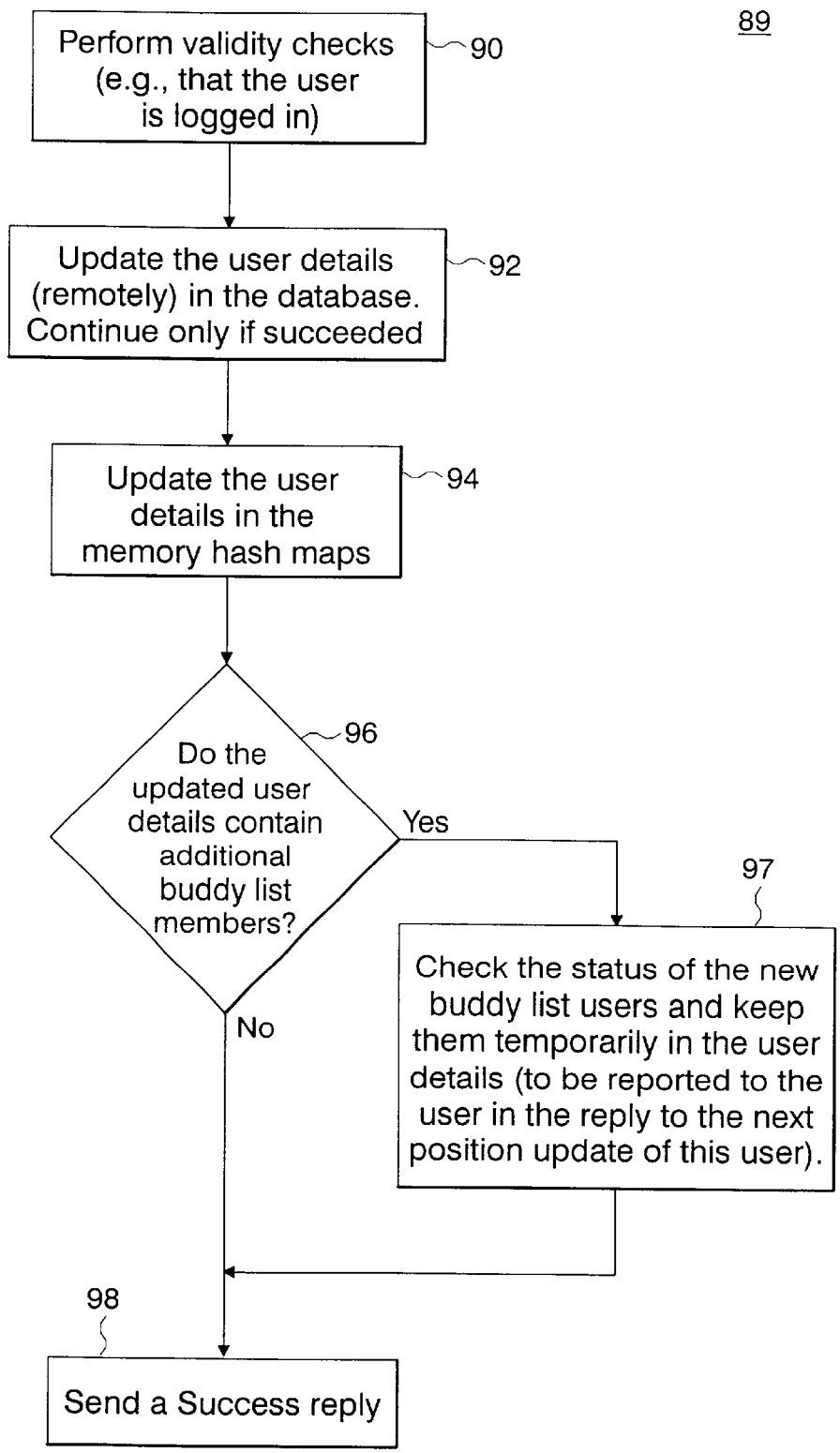
FIG. 6d is a flowchart of an exemplary process for updating user parameters in accordance with the invention.

User information may be updated at predetermined time intervals or after a predetermined number of log-ins by the user. Accordingly, FIG. 6d depicts a process 89 for updating stored user parameters. The process begins when server 10 performs a validity check for a user, for example, by checking whether the user is currently logged in (step 90). If so, server 10 remotely accesses the user's details stored in user computer 14 (step 92) and updates the stored profile for the user in the user information hash maps 10a3-1(step 94). Next, server 10 determines whether the updated user information includes additional buddy list members (Step 96). If not, the process 89 continues to step 98 below. If so, process 89 continues to step 97 where server 10 determines the status of the additional users listed in the new buddy list and transmits the information to user computer 14, after which process 89 continues to step 98. At step 98, server 10 transmits a notification to user computer 14 that the updated user parameters were successfully received and stored. After step 98, process 89 resets so that it may update information for further users.

While the invention has been particularly shown and described with reference to preferred embodiments thereof, it will be understood by those skilled in the art that various changes in form and details may be made therein without departing from the spirit and scope of the invention.

We claim:

1. A method for monitoring Internet usage by a user at a terminal, comprising the steps of:
    detecting an access by the user to a new web site having a URL;
    determining a first time interval between the detected access to the new web site and a detected access to a previous web site;
    sending said first time interval and said URL to a predefined Internet address;
    determining a second time interval which indicates a period of time during which the user actively accessed said previous web site;
    said step of sending further including the step of transmitting said second time interval to said predefined Internet address;
    receiving user registration information;
    storing said user registration information at said terminal;
    said step of sending further including the step of transmitting at least some of said user registration information to said predefined Internet address;
    compiling the user registration information in a central server;
    storing the user registration information in real time memory in said central server;
    processing the user registration information to determine current "hot" Internet sites;
    processing the user registration information to determine historically popular sites; and
    presenting the processed user registration information to said user;
    said step of presenting further including the step of displaying a histogram on a user display screen, and integrating said processed user registration information with one of link maps, directory information and other navigation tools.

2. The method of claim 1, wherein at least one of the steps of
    detecting said access, determining said first time interval, and sending said first time interval occur at a user computer.
3. The method of claim 1, wherein:
    said real-time memory is one of dynamic memory-based hash tables and disk-based log files.
4. The method of claim 1, further comprising the step of:
    upon said user entering at least one of the new web page and web site, automatically providing to said user information regarding other users which access at least one of a same web page and web site as the user.
5. The method of claim 4, further comprising the step of:
    said user communicating with at least one other user accessing at least one of the same web page and web site.
6. The method of claim 4, further comprising the step of:
    said user initiating a real-time chat with other site visitors.
7. The method of claim 1, further comprising the step of:
    leaving at least one note in a web page.
8. The method of claim 7, further comprising the steps of:
    providing a notification to the user that at least one note exists on the web page when another user visits the web page; and
    communicating with a note owner.
9. The method of claim 1, further comprising the step of:
    compiling popular "surf" patterns which originate from a particular web page.
10. The method of claim 9, further comprising the step of:
    utilizing the popular "surf" patterns to identify next web page destinations which are most popular.
11. The method of claim 10, wherein the next web page destinations which are most popular are focused according to demographic information.
12. A method for monitoring Internet usage by a user at a terminal, comprising the steps of:
    detecting an access by the user to a new web site having a URL;
    determining a first time interval between the detected access to the new web site and a detected access to a previous web site;
    sending said first time interval and said URL to a predefined Internet address;
    determining a second time interval which indicates a period of time during which the user actively accessed said previous web site;
    said step of sending further including the step of transmitting said second time interval to said predefined Internet address;
    receiving user registration information;
    storing said user registration information at said terminal;
    said step of sending further including the step of transmitting at least some of said user registration information to said predefined Internet address;
    compiling the user registration information in a central server;
    storing the user registration information in real time memory in said central server;
    querying the central server to determine whether other users are currently viewing at least one of a same web page and web site; and
    providing a number and profile of the other users, if the other users are currently viewing at least one of the same web page and web site.

13. The method of claim 12, further comprising the step of:

querying the central server to identify prospective chat targets.

14. The method of claim 12, further comprising the steps of:

requiring the user to enter additional information; and querying the central server to identify prospective chat targets.

15. The method of claim 14, further comprising the steps of:

utilizing the additional information to build user profiles and identify one of compatible and selected chat targets; and during chat initiation, presenting the additional information to contacted users to provide information regarding an initiating user.

16. The method of claim 15, wherein the additional information is at least one of areas of interest and profession.

17. The method of claim 12, further comprising the step of:

generating a list of web pages which are related to the web page which the user is presently viewing; and presenting the list of related web pages to the user.

18. A method for monitoring Internet usage by a user at a terminal, comprising the steps of:

detecting an access by the user to a new web site having a URL;

determining a first time interval between the detected access to the new web site and a detected access to a previous web site;

sending said first time interval and said URL to a predefined Internet address;

determining a second time interval which indicates a period of time during which the user actively accessed said previous web site;

said step of sending further including the step of transmitting said second time interval to said predefined Internet address;

receiving user registration information;

storing said user registration information at said terminal;

said step of sending further including the step of transmitting at least some of said user registration information to said predefined Internet address;

compiling the user registration information in a central server;

storing the user registration information in real time memory in said central server;

initiating a search for others users by executing a dynamic search based on demographic search parameters;

identifying only users which match the demographic search parameters; and communicating with the other users which match the demographic search parameters.

19. The method of claim 18, further comprising the step of:

processing demographic search parameters of matching users to generate usage profiles of the web site and web page based on biographical information of the matching users.

20. The method of claim 19, further comprising the step of:

providing the usage profiles to third parties.

21. The method of claim 20, wherein the third parties are one of advertisers, users and site owners and operators.

22. The method of claim 20, wherein the usage profiles include a number, a time, an active duration and profiles of users who have visited at least one of the web site and web page.

23. A method for determining Internet usage information from a plurality of Internet users, comprising the steps of:

receiving Internet usage messages from said plurality of users containing usage data indicating a new URL and timing information indicating a duration of access to a prior URL, receipt of each of said messages indicating that a particular user has accessed said new URL;

logging said usage data in a database;

analyzing said logged usage data to generate said Internet usage information;

providing a user software program to augment each said user's Internet, browser, said software configured to continuously:

detect an access by the user to a new web site;

determine a first time interval between the detected access to the new web site and a detected access to a previous web site, said previous web site having a URL;

sending usage messages including said first time interval and said URL to said central server;

each of said users having a user profile and a unique ID;

said usage data further including the ID associated with each of said users; and said analyzing step comprises the step of identifying web pages which are popular with users having a profile matching particular characteristics.

24. The method of claim 23, wherein said analyzing step is performed in response to a user request including said particular characteristics.

25. The method of claim 23, comprising the steps of:

querying the database to determine whether the plurality of users are currently viewing at least one of a same web page and web site; and providing a number and profile of the plurality of users, if the plurality of users are currently viewing at least one of the same web page and web site.

26. The method of claim 23, further comprising the step of:

upon each user entering at least one of the new web page and web site, automatically providing to said user information regarding other users which access at least one of a same web page and web site as the user.

27. The method of claim 26, further comprising the step of:

each user communicating with at least one other user which is accessing at least one of the same web page and web site.

28. The method of claim 26, further comprising the step of:

initiating a real-time chat with at least one other site visitor.

* * * * *